(12) United States Patent
Jiang et al.

(10) Patent No.: US 11,957,073 B2
(45) Date of Patent: Apr. 16, 2024

(54) GARDEN TOOL

(71) Applicant: Globe (Jiangsu) Co., Ltd, Jiangsu (CN)

(72) Inventors: Feng Jiang, Jiangsu (CN); Wen Tao, Jiangsu (CN)

(73) Assignee: Globe (Jiangsu) Co., Ltd, Changzhou (CN)

(*) Notice: Subject to any disclaimer, the term of this patent is extended or adjusted under 35 U.S.C. 154(b) by 766 days.

(21) Appl. No.: 17/090,860

(22) Filed: Nov. 5, 2020

(65) Prior Publication Data

US 2021/0137005 A1 May 13, 2021

(30) Foreign Application Priority Data

Nov. 11, 2019 (CN) .......................... 201911093018.X

(51) Int. Cl.
*A01D 34/68* (2006.01)
*A01D 34/69* (2006.01)
(Continued)

(52) U.S. Cl.
CPC ......... *A01D 34/6806* (2013.01); *A01D 34/69* (2013.01); *B62D 51/04* (2013.01); *A01D 2034/6843* (2013.01); *A01D 2101/00* (2013.01)

(58) Field of Classification Search
CPC .............. A01D 34/6806; A01D 34/69; A01D 2034/6843; A01D 2101/00; B62D 51/04
See application file for complete search history.

(56) References Cited

U.S. PATENT DOCUMENTS 5,375,674 A 12/1994 Peter
5,442,901 A * 8/1995 Niemela ............ A01D 34/6806
180/65.6
(Continued)

FOREIGN PATENT DOCUMENTS

CN 109392467 A 3/2019
CN 208972006 U 6/2019
(Continued)

OTHER PUBLICATIONS

Extended Search Report of Counterpart European Patent Application No. 20206466.3 dated Mar. 24, 2021.
(Continued)

*Primary Examiner* — Tony H Winner

(57) ABSTRACT

The invention provides a garden tool, which comprises a traveling assembly, a travel-driven assembly and a control assembly. The traveling assembly comprises front wheel and rear wheel. The travel-driven assembly comprises a front-drive mechanism for driving the front wheel and a rear-drive mechanism for driving the rear wheels. The control assembly controls the work of the front-drive mechanism and the rear-drive mechanism, so as to enable the front wheel and the rear wheel to respectively move forward or backward. Compared with the prior art, the garden tool drives the front wheels and the rear wheels to move forward or backward respectively through the front-drive mechanism and the rear-drive mechanism, and thus not only the garden tool automatically walks backward, but also the traveling assembly can be ensured to obtain sufficient power, thereby the garden tool is prevented from slipping when climbing and retreating.

8 Claims, 6 Drawing Sheets

(51) Int. Cl.
*B62D 51/04* (2006.01)
*A01D 101/00* (2006.01)

(56) References Cited

U.S. PATENT DOCUMENTS

| | | | |
|---|---|---|---|
| 10,080,327 B2* | 9/2018 | Helgesen | A01D 34/6812 |
| 2015/0113932 A1* | 4/2015 | Helgesen | A01D 34/68 56/11.8 |
| 2016/0201771 A1* | 7/2016 | Wadzinski | F16H 7/02 474/86 |
| 2016/0338262 A1* | 11/2016 | Liu | B08B 13/00 |
| 2017/0367265 A1 | 12/2017 | Wadzinski et al. | |
| 2019/0350130 A1* | 11/2019 | Spitz | B60W 50/14 |

FOREIGN PATENT DOCUMENTS

| | | | |
|---|---|---|---|
| EP | 1176045 A2 | 1/2002 | |
| EP | 1413498 A2 | 4/2004 | |

OTHER PUBLICATIONS

1 Examination Report of counterpart European Patent Application No. 20206466.3 dated Mar. 13, 2023.

* cited by examiner

GARDEN TOOL

CROSS-REFERENCE TO RELATED APPLICATION

This application is based upon and claims the benefit of priority from the prior Chinese Patent Application No. 201911093018.X, filed on Nov. 11, 2019, the entire contents of which are incorporated herein by reference.

TECHNICAL FIELD

The invention relates to a garden tool, in particular to an all-wheel drive garden tool.

BACKGROUND ART

At present, garden tool, such as a lawnmower, is provided with a self-propelled mechanism. The self-propelled mechanism of the lawnmower is mostly set on the rear wheel axle of the lawnmower. When walking on uneven ground, if the rear wheel falls into the pit, then there may be a situation where the rear wheel is suspended, which may cause a problem of insufficient walking power or inability to walk. Besides that, the lawnmower can only move forward, but not backward. The operator needs to stop the walking mechanism and then pull it back.

In order to solve the mentioned problem, US Patent Application No. U.S. 2017/0367265 A1 discloses a lawnmower with a walking mechanism. The lawnmower includes a main blade, an engine driving the main blade to work. The engine also drives the walking mechanism to work through a belt. By adjusting the tension of belts, the lawnmower can move forward or backward. However, this design is applied to engines powered by gasoline engines. Due to the high torque of gasoline engines, the main blade and the walking wheel can be driven to work simultaneously. However, in garden tools that use lithium battery as an energy source, the motor torque is small, and the main blade and the walking wheel cannot be driven at the same time.

It is necessary to provide a garden tool to solve the above problems.

SUMMARY OF INVENTION

The object of the present invention is to provide a garden tool, which not only doesn't slip when walking on uneven roads, but also realizes automatic walking backward, thereby facilitating the operator to turn quickly at a dead corner and improving the operator's operating experience.

In order to achieve the above object, the present invention provides a garden tool, which comprises a traveling assembly including a front wheel and a rear wheel, a travel-driven assembly including a front-drive mechanism driving the front wheel and a rear-drive mechanism driving the rear wheel and a control assembly controlling the front-wheel drive mechanism and the rear-wheel drive mechanism, the front wheel and rear wheel move forward or backward under the action of the front wheel-drive mechanism and the rear-wheel drive mechanism respectively.

As a further improvement of the present invention, the garden tool further comprises a push rod, and the push rod is provided with a speed regulating switch that cooperates with the travel-driven assembly to adjust the rotation speed of the travel-driven assembly.

As a further improvement of the present invention, the speed regulating switch includes a first position, an middle position, and a second position, when the speed regulating switch being between the first position and the middle position, the travel-driven assembly rotates in a forward speed, when the speed regulating switch being in the middle position, the rotation speed of travel-driven assembly is zero, when the speed regulating switch being between a middle position and a second position, the travel-driven assembly rotates in a backward speed.

As a further improvement of the present invention, wherein the maximum backward speed of the travel-driven assembly is not higher than half of the maximum forward speed of the travel-driven assembly.

As a further improvement of the present invention, the speed regulating switch further comprises a filtering assembly to filter a signal output by the speed regulating switch.

As a further improvement of the present invention, the garden tool further comprises a pulse width modulation assembly, and the pulse width modulation assembly is set to gradually increase the duty ratio so that the rotation speed of the travel-driven assembly gradually increases to a preset speed.

As a further improvement of the present invention, the garden tool further comprises a speed detection assembly; and when the speed detection assembly detects that the rotation speed of the travel-driven assembly is higher than a preset rotation speed, the speed detection assembly controls the pulse width modulation assembly to gradually reduce the duty ratio, thereby the rotation speed of the travel-driven assembly is gradually reduced to the preset rotation speed.

As a further improvement of the present invention, the pulse width modulation assembly comprises a front pulse width modulator that cooperates with the front-drive mechanism and a rear pulse width modulator that cooperates with the rear-drive mechanism, and the speed detection assembly includes a front speed detector that cooperates with the front-drive mechanism and a rear speed detector that cooperates with the rear-drive mechanism.

As a further improvement of the present invention, the travel-driven assembly is further provided with a soft starter to smoothly start the travel-driven assembly without impact during the starting process.

As a further improvement of the present invention, the garden tool is further provided with an alarm assembly, and when the control assembly detects that the running current of the travel-driven assembly is higher than a preset threshold value and a preset time of running is maintained, the travel-driven assembly stops working.

As a further improvement of the present invention, when the garden tool gets a signal for move back, the travel-driven assembly is configured to starts after a first predetermined time, and the first predetermined time can be set by operator.

As a further improvement of the present invention, the garden tool further comprising an alarm assembly, when the garden tool is in a backward state, the alarm assembly is configured to alert the operator in the form of sound or light As a further improvement of the present invention, the garden tool further comprising an alarm assembly, when the garden tool is in a backward state, the alarm assembly is configured to alert the operator in the form of sound or light.

The beneficial effect of the present invention is that the garden tool of the present invention not only doesn't slip when walking on uneven roads, but also realizes automatic walking backward, thereby facilitating the operator to turn quickly at a dead corner and improving the operator's operating experience.

DESCRIPTION OF EMBODIMENT

In order to make the objectives, technical solutions, and advantages of the present invention clearer, the following describes the present invention in detail with reference to the accompanying drawings and specific embodiment.

Figure 1:
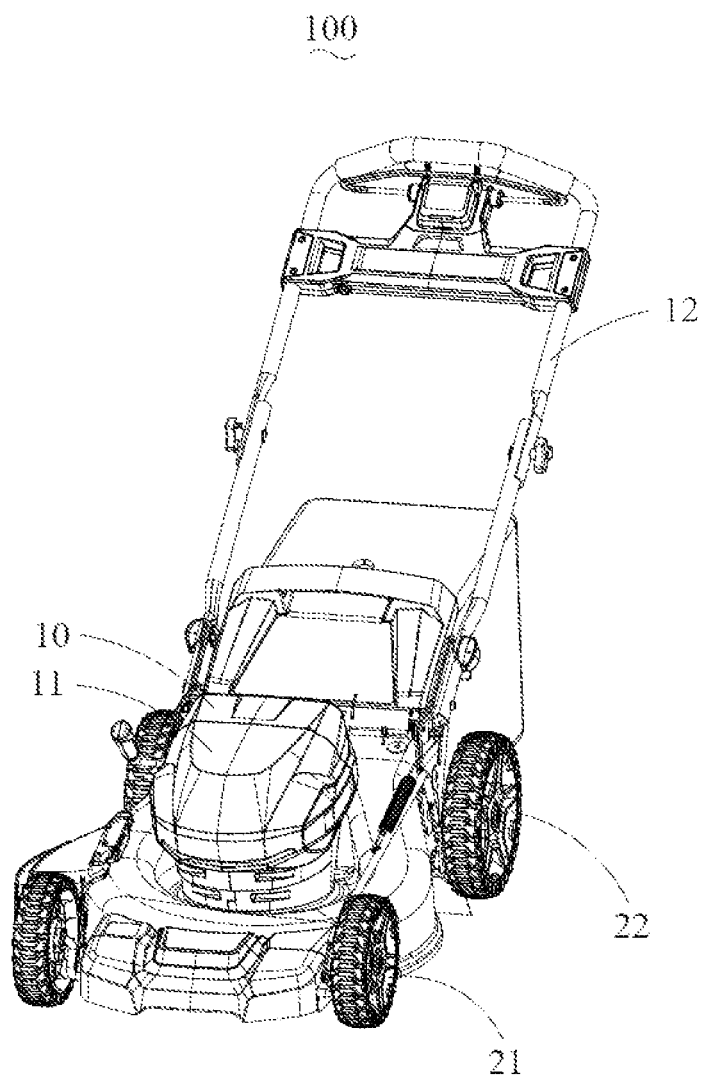
FIG. 1 is a perspective view of a three-dimensional structure of the garden tool according to the present invention.
Figure 2:
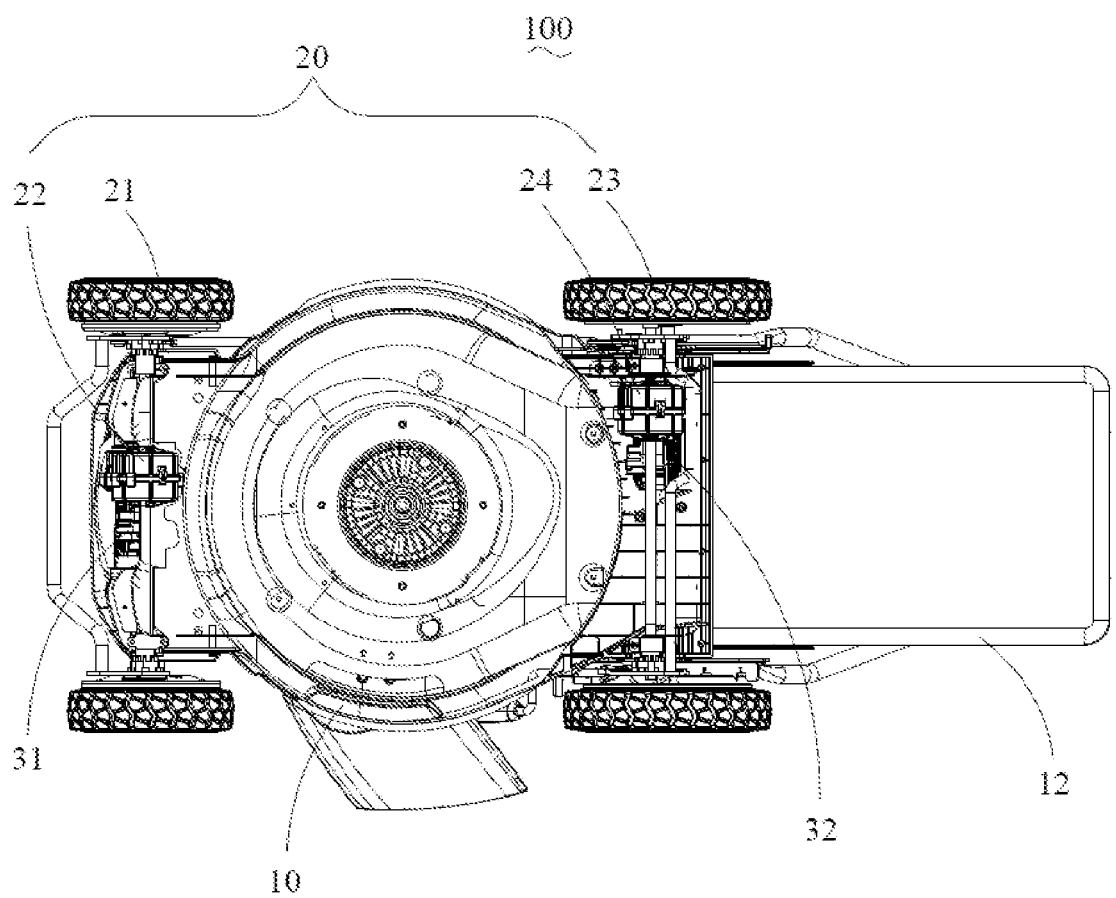
FIG. 2 is a bottom view of the garden tool shown in FIG. 1.

Please refer to FIG. 1 and FIG. 2, the invention discloses a garden tool 100 including a housing 10, a work assembly (not shown) mounted on the housing 10, a work-driven assembly 70 (shown in FIG. 6) for driving the work assembly, a traveling assembly 20 mounted on the housing 10, a travel-driven assembly 30 that drives the traveling assembly 20, a control assembly 40, a display assembly 50, and an alarm assembly 60. The work assembly may be a blade, a mowing rope, etc., and the invention does not limit the specific structure of the work assembly. In one embodiment, the work-driven assembly 70 is a motor.

Figure 3:
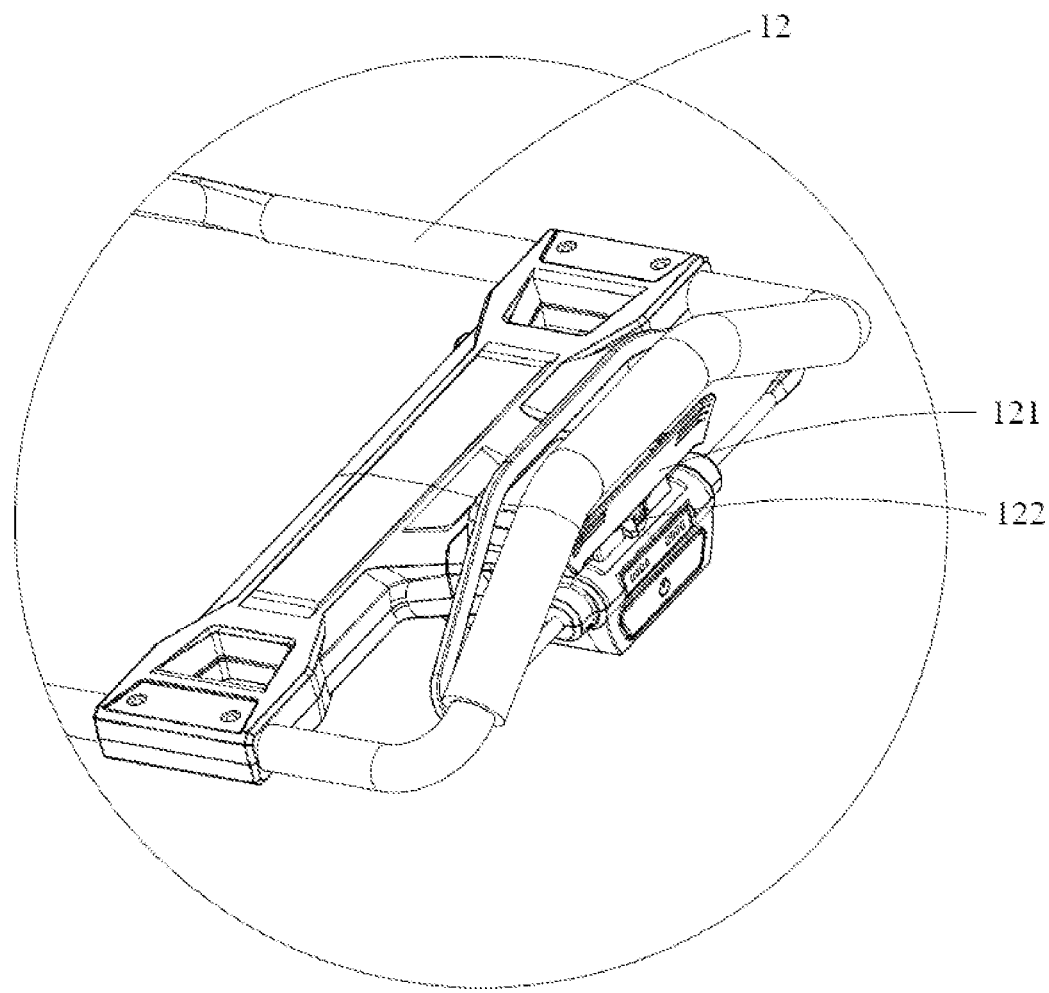
FIG. 3 is a partially enlarged schematic view of the push rod.
Figure 4:
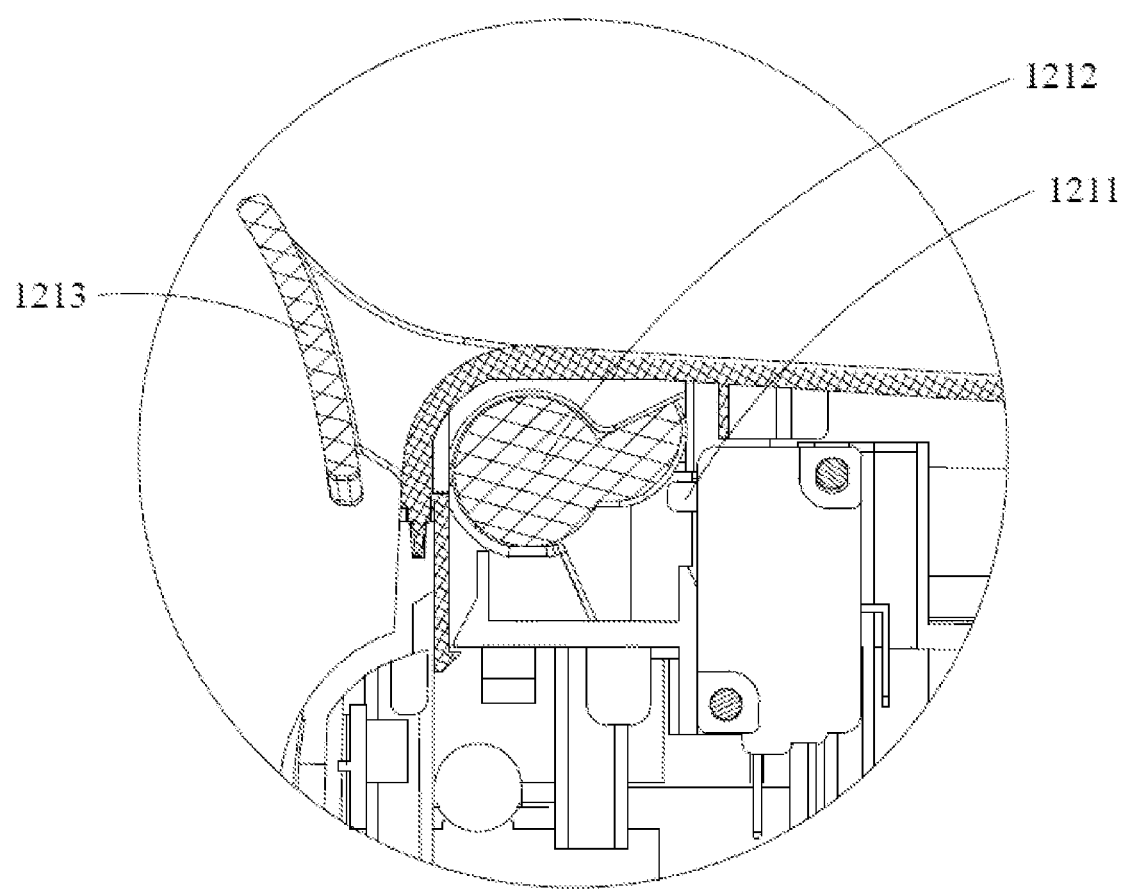
FIG. 4 is a sectional view of the self-propelled start switch.
Figure 5:
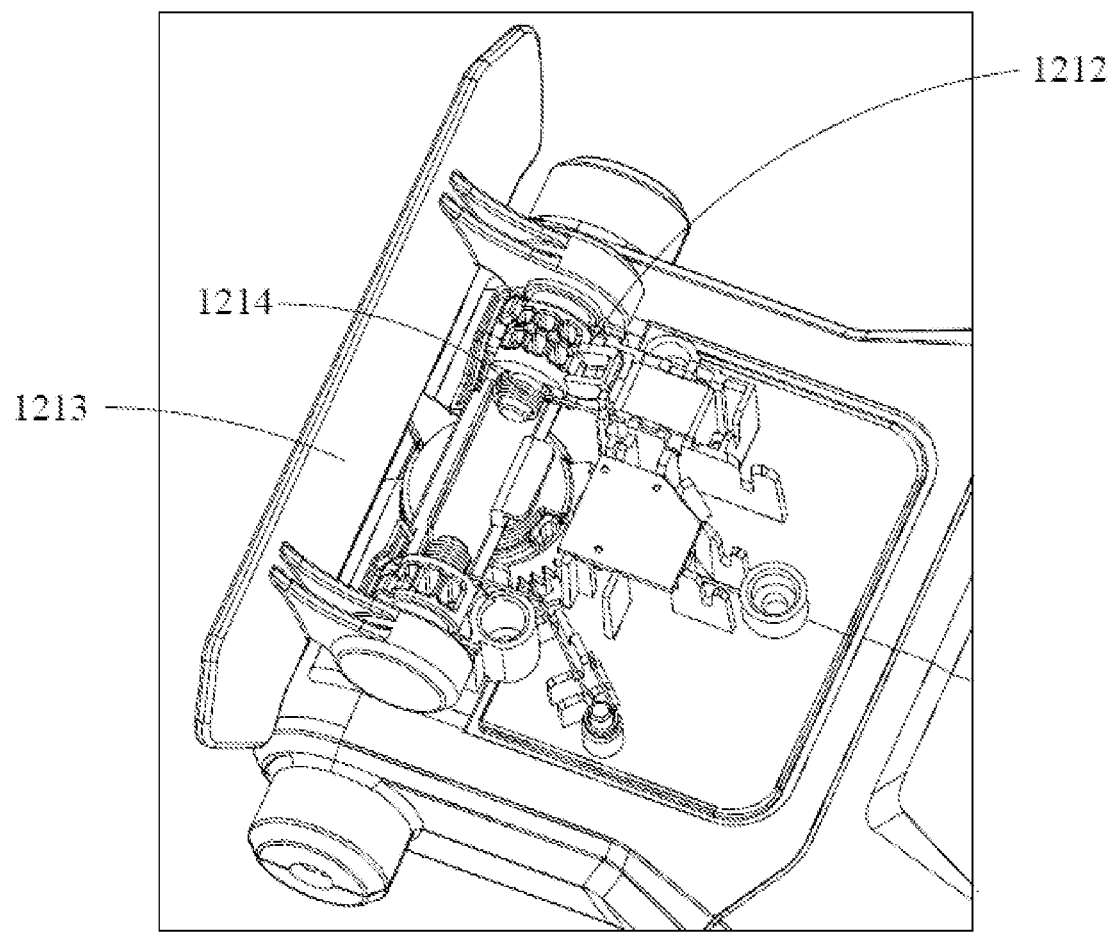
FIG. 5 is a perspective view of the self-propelled start switch.

Please refer to FIG. 1, FIG. 2 and FIG. 3, the housing 10 includes a body 11 and a push rod 12 mounted on the body 11. The push rod 12 is provided with a self-propelled start switch 121 and a speed regulating switch 122 that can control the travel-driven assembly 30. When the self-propelled start switch 121 is pushed, the travel-driven assembly 30 is powered on. Please refer to FIG. 4 and FIG. 5. In this embodiment, the self-propelled start switch 121 includes a contact 1211, a resisting block 1212 that cooperates with the contact 1211, a paddle 1213 that is pivotally mounted on the push rod 12, and an elastic element 1214 cooperating with the paddle 1213. When the paddle 1213 is pushed, the paddle 1213 rotates and drives the resisting block 1212 to move and contact with the contact 1211. At this time, the elastic element 1214 undergoes elastic deformation, and the travel-driven assembly 30 is powered on. When the paddle 1213 is released, the paddle 1213 is reset under that action of the elastic element 1214, and the resisting block 1212 is out of contact with the contact 1211. The travel-driven assembly 30 is powered off. In this embodiment, the elastic element 1214 is a torsion spring.

Please refer to FIG. 3, the speed regulating switch 122 is used to adjust the speed of the travel-driven assembly 30. In one embodiment of invention, the speed regulating switch 122 can rotate left and right along an axis. The speed regulating switch 122 includes a first position (left side position), a middle position (not shown), and a second position (right side position). When the speed regulating switch 122 is between the first position and the middle position, the travel-driven assembly 30 rotates forward, and the traveling assembly 20 walks forward. Wherein, when the speed regulating switch 122 is in the first position, the travel-driven assembly 30 rotates in the maximum forward speed. When the speed regulating switch 122 is in the middle position, the rotation speed of the travel-driven assembly 30 is zero. When the speed regulating switch 122 is between the middle position and the second position, the travel-driven assembly 30 rotates backward, and the traveling assembly 20 walks backward. Wherein, when the speed regulating switch 122 is in the second position, the travel-driven assembly 30 rotates in the maximum backward speed. Preferably, the maximum backward speed of the travel-driven assembly 30 is not bigger than half of the maximum forward speed of the travel-driven assembly 30. Further, the speed regulating switch 122 further includes a filtering assembly (not shown) to filter the signal output by the speed regulating switch 122, so the rotation speed of the travel-driven assembly 30 changes smoothly, thereby increasing the operator's comfort. The filtering assembly may be a filtering circuit or filtering software. The invention does not limit the specific structure of the filtering assembly. Preferably, the travel-driven assembly 30 may further be provided with a soft starter (not shown) to smoothly start the travel-driven assembly 30 without impact during the startup process, thereby improving the operator's comfort.

Please refer to FIG. 1 and FIG. 2, the traveling assembly 20 includes a front wheel 21, a front transmission assembly 22 that cooperates with the front wheel 21, a rear wheel 23, and a rear transmission assembly 24 that cooperates with the rear wheel 23. The travel-driven assembly 30 includes a front-drive mechanism 31 that cooperates with the front transmission assembly 22 and a rear-drive mechanism 32 that cooperates with the rear transmission assembly 24. In this embodiment, the front-drive mechanism 31 and the rear-drive mechanism 32 are both motors. In this embodiment, the front-drive mechanism 31 and the rear-drive mechanism 32 work at the same time, that is, both of them rotate forward or backward at the same time or stop working at the same time. Preferably, the garden tool 100 may further include a pulse width modulation assembly (not shown) that cooperates with a power supply assembly (not shown) and the travel-driven assembly 30. The pulse width modulation assembly is set to gradually increase the duty ratio, so that the rotation speed of the travel-driven assembly is gradually increased to a preset rotation speed. The preset rotation speed is usually set by the speed regulating switch 122. In this way, the increase in the rotation speed of the traveling assembly 20 has a changing process, so that the operator can slowly adapt to the increase in speed, which can effectively prevent the garden tool 100 from turning forward suddenly to cause the push rod 12 to disengage from the operator when the operator adjusts the speed through the speed regulating switch 122. Further, the garden tool 100 may further includes a speed detection assembly (not shown). When the speed detection assembly detects that the rotation speed of the travel-driven assembly 30 is higher than the preset rotation speed, the speed detection assembly controls the pulse width modulation assembly to gradually reduce the duty cycle so that the rotation speed of the travel-driven assembly 30 is reduced to the preset speed. Preferably, the pulse width modulation assembly includes a front pulse width modulator (not shown) that cooperates with the front-drive mechanism 31 and a rear pulse width modulator (not shown) that cooperates with the rear-drive mechanism 32. The speed detection assembly includes a front speed detector (not shown) that cooperates with the front-drive mechanism 31 and a rear speed detector (not shown) that cooperates with the rear-drive mechanism 32. In this way, the rotation speeds of the front-drive mechanism 31 and the rear-drive mechanism 32 can be adjusted and controlled separately in real time, so that the problem of the speed difference between the front-drive mechanism 31 and the rear-drive mechanism 32 can be effectively solved, and the phenomena of skidding and inability to climb slopes can be effectively improved when the front wheel and the rear wheel have different loads on the road.

Figure 6:
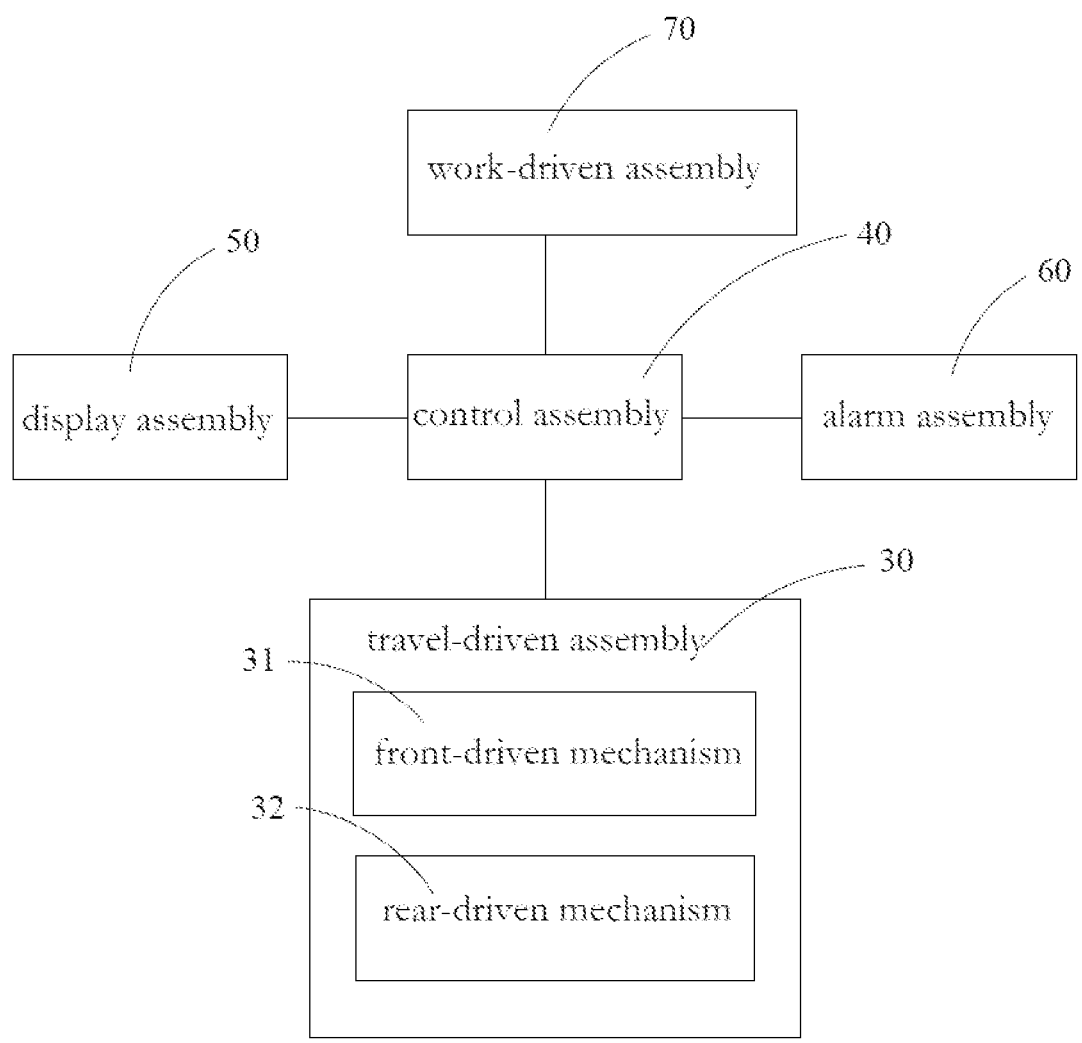
FIG. 6 is a schematic block diagram of the garden tool according to the present invention.

Please refer to FIG. 6, the control assembly 40 is used to control the operation of the front-drive mechanism 31 and the rear-drive mechanism 32, so that the front wheels 21 and the rear wheels 23 move forward or backward respectively under the action of the front-drive mechanism 32 and the rear-drive mechanism 32. At the same time, the control assembly 40 is also used to detect the rotate direction of the travel-driven assembly 30 and the running current of the travel-driven assembly 30. When the control assembly 40 detects that the travel-driven assembly 30 rotates in a backward direction, the control assembly 40 controls the work-driven assembly 70 to stop working to prevent the working assembly from continuing to work and causing harm to the operator. When the control assembly 40 detects that the speed regulating switch 122 moves from a position between the first position and the middle position to a position between the middle position and the second position, that is, when the speed regulating switch 122 changes from a forward position to a backward position, the travel-driven assembly 30 stops working within a first preset time, then the display assembly 50 displays the backward information, and the alarm assembly 60 issues an alarm signal. The alarm assembly 60 may be a horn or an alarm light. The first preset time may be set by an operator, for example, 3 seconds, 5 seconds, and so on. When the first preset time has elapsed, the control assembly 40 activates the travel-driven assembly 30 and controls the garden tool 100 to walk backward. When the control assembly 40 detects that the running current of the travel-driven assembly 30 is higher than a preset threshold and the travel-driven assembly 30 maintains the operating current for a running preset time, the control assembly 40 controls the travel-driven assembly 30 to stop to prevent the motor from working for a long time with high current and causing serious heating of the motor, thereby affecting the service life of the motor.

Compared with the prior art, the garden tool 100 of the present invention drives the front wheel 21 and the rear wheel 23 forward or backward respectively through the front-drive mechanism 31 and the rear-drive mechanism 32, so that the garden tool 100 can not only automatically walk backward, but also can ensure the traveling assembly 20 can obtain sufficient power, thereby the garden tool 100 does not slip when climbing or walking backward.

The above embodiment is only used to illustrate the technical solution of the present invention and are not limiting. Although the present invention has been described in detail with reference to the preferred embodiment, those skilled in the art should understand that the technical solution of the present invention may be modified or equivalently replaced without departing from the spirit and scope of the technical solution of the present invention.

What is claimed is:

1. A garden tool, which comprises:
   a traveling assembly including a front wheel and a rear wheel;
   a travel-driven assembly including a front-drive mechanism driving the front wheel and a rear-drive mechanism driving the rear wheel; and
   a control assembly controlling the front-wheel drive mechanism and the rear-wheel drive mechanism, the front wheel and rear wheel move forward or backward under the action of the front wheel-drive mechanism and the rear-wheel drive mechanism respectively;
   wherein the garden tool further comprises a push rod, and the push rod is provided with a speed regulating switch that cooperates with the travel-driven assembly to adjust the rotation speed of the travel-driven assembly,
   wherein the speed regulating switch includes a first position, a middle position, and a second position, when the speed regulating switch being between the first position and the middle position, the travel-driven assembly rotates in a forward speed, when the speed regulating switch being in the middle position, the rotation speed of travel-driven assembly is zero, when the speed regulating switch being between a middle position and a second position, the travel-driven assembly rotates in a backward speed.

2. The garden tool according to claim 1, wherein a maximum backward speed of the travel-driven assembly is not higher than half of a maximum forward speed of the travel-driven assembly.

3. The garden tool according to claim 1, wherein the garden tool further comprises a pulse width modulation assembly, and the pulse width modulation assembly is set to gradually increase a duty ratio so that the rotation speed of the travel-driven assembly gradually increases to a preset speed.

4. The garden tool according to claim 3, wherein the garden tool further comprises a speed detection assembly; and when the speed detection assembly detects that the rotation speed of the travel-driven assembly is higher than a preset rotation speed, the speed detection assembly controls the pulse width modulation assembly to gradually reduce the duty ratio, thereby the rotation speed of the travel-driven assembly is gradually reduced to the preset rotation speed.

5. The garden tool according to claim 4, wherein the pulse width modulation assembly comprises a front pulse width modulator that cooperates with the front-drive mechanism and a rear pulse width modulator that cooperates with the rear-drive mechanism, and the speed detection assembly includes a front speed detector that cooperates with the front-drive mechanism and a rear speed detector that cooperates with the rear-drive mechanism.

6. The garden tool according to claim 1, wherein the garden tool is further provided with an alarm assembly, and when the control assembly detects that a running current of the travel-driven assembly is higher than a preset threshold value and a preset time of running is maintained, the travel-driven assembly stops working.

7. The garden tool according to claim 1, wherein when the garden tool gets a signal for moving backward, the travel-driven assembly is configured to starts after a first predetermined time, and the first predetermined time can be set by an operator.

8. The garden tool according to claim 1, wherein the garden tool further comprising an alarm assembly, when the garden tool is in a backward state, the alarm assembly is configured to alert an operator in a form of sound or light.

* * * * *